Patented Mar. 10, 1942

2,275,790

UNITED STATES PATENT OFFICE 2,275,790

ALDEHYDES OF THE SATURATED AND UNSATURATED PREGNANE-SERIES AND PROCESS OF MAKING SAME

Karl Miescher, Riehen, and Werner Fischer, Caesar Scholz, and Albert Wettstein, Basel, Switzerland, assignors, by mesne assignments, to Ciba Pharmaceutical Products, Incorporated, Summit, N. J., a corporation of New Jersey No Drawing. Application June 27, 1939, Serial No. 281,488. In Switzerland July 1, 1938

8 Claims. (Cl. 260—397.4)

This invention relates to the manufacture of aldehydes of the saturated and unsaturated pregnane-series in which the aldehyde group is in 21-position. The method of manufacture may be one that is in itself known (compare for example: "Chemie der Kohlenstoffverbindungen," 12th edition, vol 1, page 245 and following and J. Houben: "Die Methoden der Organischen Chemie," 3rd edition, vol. 3, page 529 and following).

As parent materials may be used for example compounds of the saturated and unsaturated pregnane-series which contain an oxy-group in 21-position or a reactive ester of such compound. These compounds are subjected to an oxidizing process whereby an aldehyde group is formed in 21-position. The usual oxidizing agents have proved advantageous in this case (compare J. Houben, loc. cit. vol. 2, page 22 and following and 47 and following), also the exchange of oxidation stages with carbonyl compounds in presence of metal alcoholates as well as biochemical oxidation. A further oxidizing process consists in starting from a reactive ester of a 21-oxy-compound for example a 21-halogen or a 21-toluene sulphonic acid ester compound and converting this in a manner in itself known, for example by way of the hexamethylene-tetramine-compound (compare Sommelet: "Comptes rendus," 157, 852 (1913)), into the corresponding aldehyde. The last named process is particularly suitable in the case where the parent material is a 21-halogen derivative with an active hydrogen atom in 21-position, for instance in the case of $\Delta^{17;20}$-unsaturated 21-halogen derivatives or in the case of a 20-keto-21-halogen derivative. Further free carbinol groups which may be present may be converted if desired in the course of such an oxidation process also into carbonyl groups. If a simultaneous oxidation or dehydrogenation of such carbinol groups or other oxidizable groupings is not desired, these groups or groupings may be protected for instance by esterification or etherification. Parent materials having secondary carbinol groups protected by esterification and free primary carbinol groups in 21-position are accessible by reaction of the free polyoxy-compound with a triarylmethyl halide to form a 21-mono-ether, action of an acylating agent whereby an ether-ester is obtained and eliminating the 21-ether group for example by means of an acid or reducing agent. Also double linkings which may be present may be protected intermediately if desired in the known manner. Instead of a 21-oxy-compound the parent material may be a 21-acid derivative of the saturated and unsaturated pregnane-series, for instance a carboxylic acid halide or anhydride, a carboxylic acid salt, an imido halide, a diarylamidine or the like and this may be treated with a reducing agent whereby a 21-aldehyde is also produced (compare J. Houben, loc. cit., vol. 2, page 287 and following). In the course of this reaction also an ethylene oxide group present in 17:20-position may be reduced with formation of a hydroxyl group.

A further method consists in eliminating the side chain double linking in 21-unsaturated derivatives of this series, for example by an oxidation. This may be done by ozonizing and splitting the ozonide, by action of a peroxide preferably in presence of osmium tetroxide, or by adding two hydroxyl groups at the double linking and by scission of the glycol thus produced (compare J. Houben, loc. cit., vol. 2, page 127 and following and 153 and following). If desired nuclear double linkings may thereby be temporarily protected as also may be further oxidizable groupings. In the case of a carbon-nitrogen-double linking the splitting may be effected hydrolytically.

The parent material may be substituted in the nucleus as well as in the side chain in any desired manner and may be of any desired steric configuration. In particular one may start even from 17:20-unsaturated compounds or from compounds which in this 17:20-position contains an oxido group or one or two free or substituted hydroxyl groups, for instance acyloxy-, alkoxy- or halogen-groups or a methylene-group or keto-group in 20-position. At any desired period of time in the reaction a free or esterified hydroxyl group being present in 17-position may be eliminated in the form of water or an acid. Moreover a free or substituted hydroxyl group may be introduced in a manner in itself known in α-position to the new aldehyde group and the compound thus obtained may be treated with a re-esterifying hydrolyzing and/or esterifying or etherifying agent. Added to this one may attack the compound, for instance with halogen and if desired substitute for the halogen in the α-halogen derivative thus obtained a free or substituted hydroxyl group by aid of a hydrolyzing or re-esterifying agent. The same goal may be attained, however, by adding oxygen to the aldehyde enol derivative of the parent material, for example an enol ester, enol ether or enamine and treating the ethylene oxide compound thus obtained with a hydrolyzing agent or by saturating the enol double linking with free, esterified or etherified hydroxyl groups.

The final products are useful as therapeutic agents or as intermediate products for obtaining compounds of therapeutical value.

The following examples illustrate the invention, the parts being by weight:

Example 1

Into a cooled solution of 1 part of $\Delta^{4,5}$, $\Delta^{17,20}$-pregnadiene-3-one-21-ol (melting point 138-139° C.; made for instance from vinyl-testosterone by heating it with acetic anhydride) in 85 parts of benzene and 15 parts of glacial acetic acid, there is introduced while stirring an acetic acid solution of 0.2 part of chromic acid. After some time the mass is heated gradually to 60-70° C. When all the chromic acid has been consumed the whole is cooled, mixed with water and extracted with ether. The benzene-ether solution is washed with water, dried and distilled in a vacuum to remove the solvent. There is left a neutral oil which may be further purified by distillation in a high vacuum, crystallization or removal from a mixture of solvents or by chromatographing. In this manner there is obtained a colourless crystalline $\Delta^{4,5}$, $\Delta^{17,20}$-pregnadiene-3-one-21-al of melting point 150–152° C. and $[\alpha]^{18}_D = +141.5°$.

The reaction may also be conducted in benzene solution by shaking this with an aqueous chromic acid solution.

Example 2

3.7 parts of $\Delta^{5,6}$-17-allyl-androstene-3:17-diol-3-monoacetate melting point 154-156° C. are dissolved in 180 parts of glacial acetic acid and into this solution while it is cooled and stirred there is gradually dropped a solution of 1.6 parts of bromine in 32 parts of glacial acetic acid. The mass is then ozonized while cooling until a sample of the solution no longer absorbs bromine. For dehalogenation 15 parts of zinc dust are added and the whole is vigorously stirred for 4 hours at 50° C. and then filtered. The greater part of the solvent is evaporated from the filtrate in a vacuum and the residue is poured into water and the whole extracted with ether. The ethereal solution is washed with N-sodium carbonate solution and water in succession and then evaporated. The residue is caused to react with the chloride of trimethylamino-acetic acid hydrazide in solution in absolute alcohol mixed with acetic acid; from the mixture the water-soluble carbonyl fraction of the product of the reaction is separated in known manner. This fraction is saponified by allowing it to stand with addition of 1 per cent sulphuric acid and 2 per cent of formaldehyde at 50° C.; the mass is then extracted with benzene, the benzene solution is dried and then passed through a column of aluminium oxide. By evaporating the benzene and recrystallizing the residue from dilute acetone colourless needles of melting point 187-188° C. are obtained. These may be supposed to have the constitution of a $\Delta^{5,6}$, $\Delta^{17,20}$-3-acetoxy-pregnadiene-21-al.

Instead of ozonizing $\Delta^{5,6}$-17-allyl-androstene-3:17-diol-3-monoacetate after partial bromination there may be added to the double linking of the side chain two hydroxyl groups, for instance by means of osmium tetroxide. From the tetrol thus obtained there is produced by action of for instance periodic acid or lead tetracetate the $\Delta^{5,6}$-pregnene-3:17-diol-21-al and its 3-mono-acetate or by eliminating water the described $\Delta^{5,6}$, $\Delta^{17,20}$-3-acetoxy-pregnadiene-21-al.

In like manner there may be made from $\Delta^{4,5}$-17-allyl-androstene-3-one-17-ol (made for instance from $\Delta^{5,6}$-17-allyl-androstene-3:17-diol by oxidation with aluminiumsopropylate in presence of cyclohexanone) or from its enol derivative by addition of two hydroxyl groups at the side chain double linking, for example with aid of osmium tetroxide and scission of the glycol produced, for instance by means of periodic acid or lead tetracetate the $\Delta^{4,5}$-pregnene-3-one-17-ol-21-al of melting point 149–151° C. $[\alpha^{18}_D = +83°]$ or with elimination of water $\Delta^{4,5}$, $\Delta^{17,20}$-pregnadiene-3-one-21-al of melting point 150–152° C. $[\alpha^{18}_D = +141.5°$ C.$]$.

Example 3

1 part of 3-acetoxy-androstane-17-acetic acid chloride (made for example from $\Delta^{5,6}$, $\Delta^{17,20}$-pregnadiene-3-ol-21-acid of melting point 217-218° C. by hydrogenation, acetylation and treatment with thionyl chloride; the parent acid may be made from trans-dehydro-androsterone-acetate by reaction with bromacetic acid ester, elimination of water and saponification) is reduced by hydrogen, with aid of 1 part of palladium barium sulphate catalyst, in 30 parts of dry xylene at a bath temperature of about 150° C. When the reaction is complete the whole is filtered. The filtrate is evaporated and the residue purified by recrystallization, chromatographing or by conversion into carbonyl derivative. The 3-acetoxy-pregnane-21-al is thus obtained in the form of colourless crystals.

Alternatively to reduce the acid chloride the corresponding calcium salt may be heated with calcium formate.

If instead of the above compound a corresponding 17:20-oxido-compound is used as parent material the oxygen bridge is reduced in the course of the reaction.

To a solution of 3.6 parts of the above described 3-acetoxy-pregnane-21-al in 100 parts of glacial acetic acid there is added a drop of a solution of hydrogen bromide in glacial acetic acid and quite gradually there is allowed to flow in a solution of 1.6 parts of bromine in 50 parts of glacial acetic acid. The mixture is then poured into 1000 parts of water and the whole is extracted with ether. The ethereal solution is washed with much water and evaporated. The residue is esterified by boiling for 1 hour with a solution of 3 parts of potassium acetate in 100 parts of absolute alcohol, the mass is again poured into water and the whole extracted with ether and the ethereal solution washed with much water. On evaporation of the ether there is left a residue through which after chromatographic purification there may be obtained by recrystallization from hexane or dilute acetone the 3:20-diacetoxy-pregnane-21-al.

By cautious saponification with aqueous alcoholic potassium carbonate solution the pregnane-3:20-diol-21-al is obtained.

Instead of the pregnane-derivative one may start from the corresponding allo-pregnane-compound.

Example 4

1 part of $\Delta^{4,5}$-pregnene-3:20-dione-21-ol is heated together with 4 parts of phenylhydrazine in dilute acetic acid for some time on the water bath whereby 3 mols of phenyl-hydrazine enter into reaction and the sparingly soluble phenyl-osazone-phenylhydrazone gradually separates.

This is filtered with suction and washed with water. For scission the compound is heated at 40° C. with 10 parts of hydrochloric acid of specific gravity of about 1.2 and then allowed to stand at room temperature for some time. The phenylhydrazine hydrochloride which has separated is redissolved by addition of sufficient water and the mixture is extracted with methylene chloride. After evaporation of the latter the $\Delta^{4,5}$-pregnene-3:20-dione-21-al is purified by recrystallization, adsorption or sublimation; it melts at 104–106° C.

The oxidation may be brought about for example by the process of exchange of oxidation stages, for instance by means of aluminium tertiary butylate in presence of diethylketone.

Example 5

A mixture of 1 part of $\Delta^{5,6}$-pregnene-3:17:20: 21-tetrol (melting point 229-231° C.; made for example from $\Delta^{5,6}$-17-vinyl-androstene-3:17-diol-3-monoacetate by treatment with osmium tetroxide) 200 parts of benzene, 3 parts of aluminium isopropylate and 100 parts of benzaldehyde are heated together to boiling for several hours. The solution thus obtained is washed with strongly diluted sulphuric acid and water and dried over sodium sulphate, whereafter the solvent is evaporated. The residue is recrystallized and sublimed; it is $\Delta^{4,5}$-pregnene-3:20-dione-17-ol-21-al.

Instead of benzaldehyde there may be used for instance diethylketone or diisopropylketone. If the dehydrogenation is conducted in presence of acetone instead of benzaldehyde there is formed primarily a condensation product of the newly produced aldehyde group with the reactive methylene group of the acetone. This product may be split in known manner, for instance by means of ozone preferably with preliminary protection of the cyclo-double-linking, to produce the described aldehyde.

Example 6

1 part of $\Delta^{4,5}$-pregnene-17:20:21-triol-3-one (melting point 233–235° C.; made for example from vinyltestosterone by treatment with osmium tetroxide) is mixed in a mixture of dioxane and water with 5 parts of aqueous hydrogen-peroxide. 0.5 part of barium carbonate is added and then by drops while strongly stirring at first with cooling and then at room temperature 1 part of ferrous sulphate in a little water. The mixture is then allowed to stand for ½ a day at room temperature until the hydrogen peroxide has been consumed. To the weakly acid liquid is now added 0.1 part of barium carbonate and the liquid is concentrated in a vacuum and taken up in alcohol in order that inorganic substances may be separated by filtration. The solvent is then evaporated from the filtrate, the residue is mixed with a little water and extracted by means of methylene-chloride to dissolve $\Delta^{4,5}$-pregnene-17:20-diol-3-one-21-al. By evaporating the solvent and purifying by crystallization, sublimation, adsorption or by way of a derivative, for instance phenylhydrazone or semi-carbazone, the new compound is isolated.

Advantageously instead of from free pregnenetriol-one one may start from its 20-mono- or 17:20-diacyl-compound. They may be made for example from $\Delta^{4,5}$-pregnene-17:20:21-trial-3-one-21-monotritylether by cautiously or strongly acylating and subsequently eliminating the 21-ether residue by means of an acid agent. By using as parent material the corresponding isomeric trial of melting point 189–190° C. (made for example from $\Delta^{4,5}$, $\Delta^{17,20}$-pregnadiene-3-one-21-ol by treatment with osmium tetroxide) the corresponding isomeric 21-aldehyde may be obtained in an analogous manner.

Example 7

1 part of $\Delta^{4,5}$-21-bromo-pregnene-3-one (made for example from $\Delta^{5,6}$-17-ethenyl-androstene-3:17-diol, acylated with propionic acid anhydride to $\Delta^{5,6}$ - 17 - ethenyl - androstene - 3:17 - diol - 3 - propionate, transposition by means of acetic anhydride to $\Delta^{5,6}$, $\Delta^{17,20}$-pregnadiene-3:21-diol-3-propionate-21-acetate, partial saponification, hydrogenation and bromination to $\Delta^{5,6}$-21-bromo-pregnene-3-ol-propionate, saponification and oxidation of the free 3-OH-group) is heated together with 0.5 part of hexamethylenetetramine in 20 parts of aqueous alcohol for 3 hours under reflux. The greater part of the solvent is then evaporated in a vacuum and from the residue the $\Delta^{4,5}$-pregnene-3-one-21-al is isolated, for example by way of its condensation product with a ketone reagent, by chromatographing, sublimation and recrystallization from dilute methanol.

3 parts of this $\Delta^{4,5}$-pregnene-3-one-21-al are converted by boiling for 6 hours with 60 parts of acetic anhydride and 3 parts of anhydrous sodium acetate into its 21-enolacetate. The latter is precipitated by means of water and extracted by ether and the ethereal solution treated with an ethereal solution of 1.5 parts of perbenzoic acid. The small excess of acid is now withdrawn with N-sodium carbonate solution and the ethereal solution is washed further with water, dried and evaporated. The residue is heated with alcoholic hydrochloric acid to hydrolize the α-oxide. Finally aqueous potassium carbonate solution is added for the purpose of completely saponifying the enol-ester-group and the solution is poured into water and extracted with ether; the ethereal solution is washed with water, dried and evaporated. The residue purified by chromatographing is crystallized from dilute acetone in the form of colourless needles which are $\Delta^{4,5}$-pregnene-3-one-20-ol-21-al. This body may be converted for instance by action of an acid anhydride or chloride in pyridine at room temperature into its ester, for instance acetate, propionate or benzoate.

In an analogous manner one can obtain instead of enol-esters, enol-ethers or enamines which may be again split up by means of acid.

What we claim is:

1. A process for the manufacture of aldehydes of the saturated and unsaturated pregnane series, comprising subjecting a member of the group consisting of a 21-hydroxy-compound of this series and reactive esters thereof to an oxidation process.

2. A process for the manufacture of aldehydes of the saturated and unsaturated pregnane series, comprising subjecting a member of the group consisting of a 21-hydroxy-compound of this series and reactive esters thereof to an oxidation process with temporary protection of double linkings and other groupings capable of oxidation.

3. A process for the manufacture of aldehydes of the unsaturated pregnane series, comprising subjecting a member of the group consisting of a 17,20-unsaturated 21-hydroxy-compound of this series and reactive esters thereof to an oxidation process.

4. The saturated and unsaturated pregnane-17,20-diol-21-als.
5. The Δ⁴,⁵-pregnene-3-one-17,20-diol-21-als.
6. The saturated and unsaturated pregnane-17-ol-20-one-21-als.
7. The Δ⁴,⁵-pregnene-3,20-dione-17-ol-21-als.
8. The saturated and unsaturated pregnane-17-ol-21-als.

KARL MIESCHER.
WERNER FISCHER.
CAESAR SCHOLZ.
ALBERT WETTSTEIN.